(12) United States Patent
Yao

(10) Patent No.: US 10,587,209 B2
(45) Date of Patent: Mar. 10, 2020

(54) GENERATING POWER FOR ELECTRONICS ON A GAS METER

(71) Applicant: Natural Gas Solutions North America, LLC, Houston, TX (US)

(72) Inventor: Richard Jin Yao, The Woodlands, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 479 days.

(21) Appl. No.: 15/452,823

(22) Filed: Mar. 8, 2017

(65) Prior Publication Data
US 2018/0262129 A1   Sep. 13, 2018

(51) Int. Cl.
| | |
|---|---|
| *H01L 41/113* | (2006.01) |
| *H02N 2/18* | (2006.01) |
| *H02J 7/00* | (2006.01) |
| *G01F 15/00* | (2006.01) |
| *G05D 16/06* | (2006.01) |
| *H02J 7/32* | (2006.01) |

(52) U.S. Cl.
CPC ........... *H02N 2/186* (2013.01); *G01F 15/002* (2013.01); *G05D 16/0655* (2013.01); *H02J 7/0052* (2013.01); *H02J 7/32* (2013.01)

(58) Field of Classification Search
CPC ........ H02N 2/186; G01F 1/56; G05D 16/063; H02J 7/0052
USPC .................................................. 310/324, 339
See application file for complete search history.

(56) References Cited

U.S. PATENT DOCUMENTS

| | | | |
|---|---|---|---|
| 5,069,067 A | 12/1991 | Ingman | |
| 6,053,045 A * | 4/2000 | Nakamura | G01P 15/0922 280/735 |
| 6,768,214 B2 | 7/2004 | Schultz et al. | |
| 8,963,401 B2 * | 2/2015 | Smirnov | F04B 43/046 310/324 |
| 9,310,237 B2 | 4/2016 | Ramsay | |
| 2007/0074566 A1 * | 4/2007 | Roundy | B60C 23/0411 73/146 |

(Continued)

FOREIGN PATENT DOCUMENTS

JP   2008-33658 A   *   2/2008  ............. G05D 16/20

OTHER PUBLICATIONS

Tahla et al., Piezoelectric Based Flow Power Harvesting for Downhole Environments, SPE Middle East Intelligent Oil & Gas Conf. and Exhib., Sep. 15-16, 2006, Abu Dhabi, UAE.

*Primary Examiner* — Thomas M Dougherty
(74) *Attorney, Agent, or Firm* — Paul Frank + Collins, P.C.

(57) ABSTRACT

An energy harvester for use to provide power to metrology hardware like gas meters and flow measuring devices. The energy harvester may include an actuator that mounts to a substrate found in the gas meter or in an adjacent, collateral device like a pressure regulator. The substrate may embody a diaphragm or membrane, possibly a thin, flexible or semi-rigid member. The actuator may include piezoelectric transducers that mount to this member. In operation, the piezoelectric transducers can generate an electrical signal in response to mechanical activity (or energy) from the thin member. The electrical signal can be directed to the flow device to replace, supplement, or recharge a power source that powers electronics necessary to expand functions on the flow meter.

20 Claims, 9 Drawing Sheets

(56) References Cited

U.S. PATENT DOCUMENTS

| | | | |
|---|---|---|---|
| 2009/0167114 A1* | 7/2009 | Sapir | H01L 41/0973 |
| | | | 310/339 |
| 2010/0308592 A1* | 12/2010 | Frayne | H02N 2/185 |
| | | | 290/54 |
| 2011/0010112 A1 | 1/2011 | Bonnat | |
| 2011/0140578 A1* | 6/2011 | Ko | B60C 23/0411 |
| | | | 310/339 |
| 2012/0206017 A1* | 8/2012 | Karkkainen | B60C 23/0411 |
| | | | 310/339 |
| 2014/0241550 A1* | 8/2014 | Sunahara | G10K 9/122 |
| | | | 381/190 |
| 2015/0002735 A1 | 1/2015 | Murphee et al. | |
| 2016/0268932 A1* | 9/2016 | Takao | B60R 19/52 |
| 2017/0207730 A1* | 7/2017 | Takao | F03D 5/06 |
| 2018/0124522 A1* | 5/2018 | Park | H04R 1/025 |
| 2019/0027931 A1* | 1/2019 | Berkcan | H02J 3/00 |

* cited by examiner

GENERATING POWER FOR ELECTRONICS ON A GAS METER

BACKGROUND

Metrology hardware finds use across a wide range of applications. For example, the fuel gas industry uses metering systems, or flow meters, to measure consumption, bill customers, and manage inventory. Some of these flow meters are mechanical, positive-displacement devices. Rotary-types of these devices may include an impeller that rotates in response to flow of gas. In other types, the flow of gas translates a diaphragm or bellows. Other mechanical devices may leverage a turbine or like rotating element (e.g., a pinwheel). In use, the flow meter (or collateral system) can monitor movement of the working mechanism to quantify the amount of gas. Some flow meters may be electronic, using technology like hotwire, ultrasound, or lasers to measure the amount of gas. But, while both mechanical and electronic flow meters are proven to be very accurate, reliable, and typically require little or no maintenance, the device typically lacks capacity to power electronics that would expand functions for remote communications, data exchange, and automated meter reading (AMR).

SUMMARY

The subject matter of this disclosure is useful to provide power to metrology hardware. Of particular interest herein are energy harvesters that can generate power in response to vibrating members like diaphragms and membranes. These energy harvesters can install as part of a flow devices (e.g., a flow meter or a pressure regulator) or, more generally, on an adjacent collateral device, effectively operating to harvest energy from residual or in situ vibration that occurs naturally on these devices. The resulting power can replace, supplement, or charge a power source that supports electronics necessary to expand functions on the flow meter.

The embodiments address certain drawbacks one might associate with the on-board power source. For batteries and battery packs, using the energy harvester to re-charge or reduce duty cycle on these devices may preclude maintenance necessary to check and replace them in the field. This feature may save significant costs of labor because, for example, gas meters may number in the hundreds and thousands in the field and, moreover, often reside in remote areas, both of which may present major logistical challenges that require careful planning. Use of the energy harvester may also improve reliability in the event that batteries die unexpectedly or suffer reduction or total loss of energy prematurely, which is a significant nuisance and unplanned expense for the operator.

The embodiments may also address future power needs for gas meters and related metrology hardware. For gas meters, the energy harvester may provide sufficient power to meet future data transmission demands that would otherwise exceed the on-board power source by, for example, drawing an unreasonable amount of power from an on-board battery or energy storage unit. On-board energy harvesting can also allow gas meters to expand functionality, for example, in the form of new electronics and sensors including transmitting devices to communicate with a Supervisory Control and Data Acquisition (SCADA) system, cloud-connected product life-cycle management software, automated meter reading (e.g., smart meters), and the like. In use, duty cycle for transmitting data may be periodic, which would elevate power demand for brief periods of time. More demanding scenarios might require real-time data transmission to monitor ongoing device health or diagnostics in a connected system, which may require almost-continuous supply of reliable power on the device.

BRIEF DESCRIPTION OF THE DRAWINGS

Reference is now made briefly to the accompanying figures, in which.

DETAILED DESCRIPTION

The discussion that follows describes embodiments that employ structure to harvest energy in situ on flow devices, such as flow meters. These devices may quantify parameters (e.g., flow rate, volume, etc.) of fluids and solids. Other examples may regulate flow of these materials. As described below, some embodiments may employ electromechanical interaction to harvest energy from moving parts, for example, diaphragms or bellows that are susceptible to deformation due to mechanical activity (e.g., motion or vibration) or that might generate mechanical energy in response to action by the material. The harvested energy may be directed to supplement power on the flow device. Other embodiments are within the scope of the subject matter of this disclosure.

Figure 1:
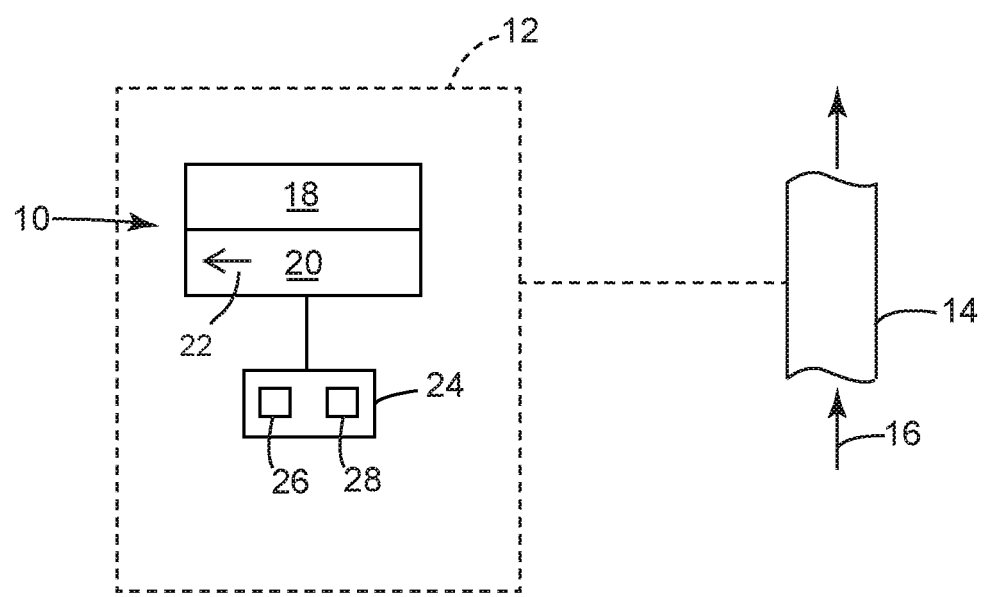
FIG. 1 depicts a schematic diagram of an exemplary embodiment of a energy harvester that is configured to harvest energy in situ from vibrating members on a flow device.

FIG. 1 depicts a schematic diagram of an exemplary embodiment of an energy harvester 10 that can generate power. This example integrates with a flow device, indicated generally by the dashed line enumerated 12. The flow device 12 may couple with a conduit 14, possibly a pipe, pipeline, or tube that carries material 16. Examples of material 16 may include fluids (e.g., liquids and gases), but the flow device 12 may also work with solids and solid/liquid compositions, as well. The flow device 12 may embody devices that perform functions that relate to flow of material 16. Exemplary devices embody valves, valve assemblies, pressure regulators, and like "regulatory" devices that regulate flow. In other functions, the device may help measure or "meter" flow as found on flow meters (e.g., gas meters) that quantify flow rate or flow volume.

The energy harvester 10 may be configured to harvest energy from the flow device 12. These configurations may include a substrate 18, which can be deformable or displaceable, and an actuator 20. The substrate 18 may embody a diaphragm or a flexible membrane that is found inside of pressure regulators and gas meters. In use, the actuator 20 may be configured to generate a signal 22, preferably an electrical signal for use at electronics 24 found on-board the flow device 12. The electronics 24 may include devices 26 and operative circuitry 28. Exemplary devices 26 may include sensors, micro-controllers and related processors; however, the flow device 12 may also benefit from on-board energy storage units (e.g., rechargeable batteries and super capacitors).

At a high level, the energy harvester 10 can take advantage of motion or vibration of the substrate 18 to generate power. This mechanical activity may arise directly as a result of operation of the flow device 12 or indirectly in the form of perturbations, for example, from material 16 that flows either in the flow device 12, the conduit 14, or both. Process lines and collateral equipment that operate in proximity to the flow device 12 may also generate forces on the substrate 18. In one implementation, the mechanical activity may deform the substrate 18 to create mechanical energy. The actuator 20 may react to the mechanical activity to generate the signal 22.

Figure 2:
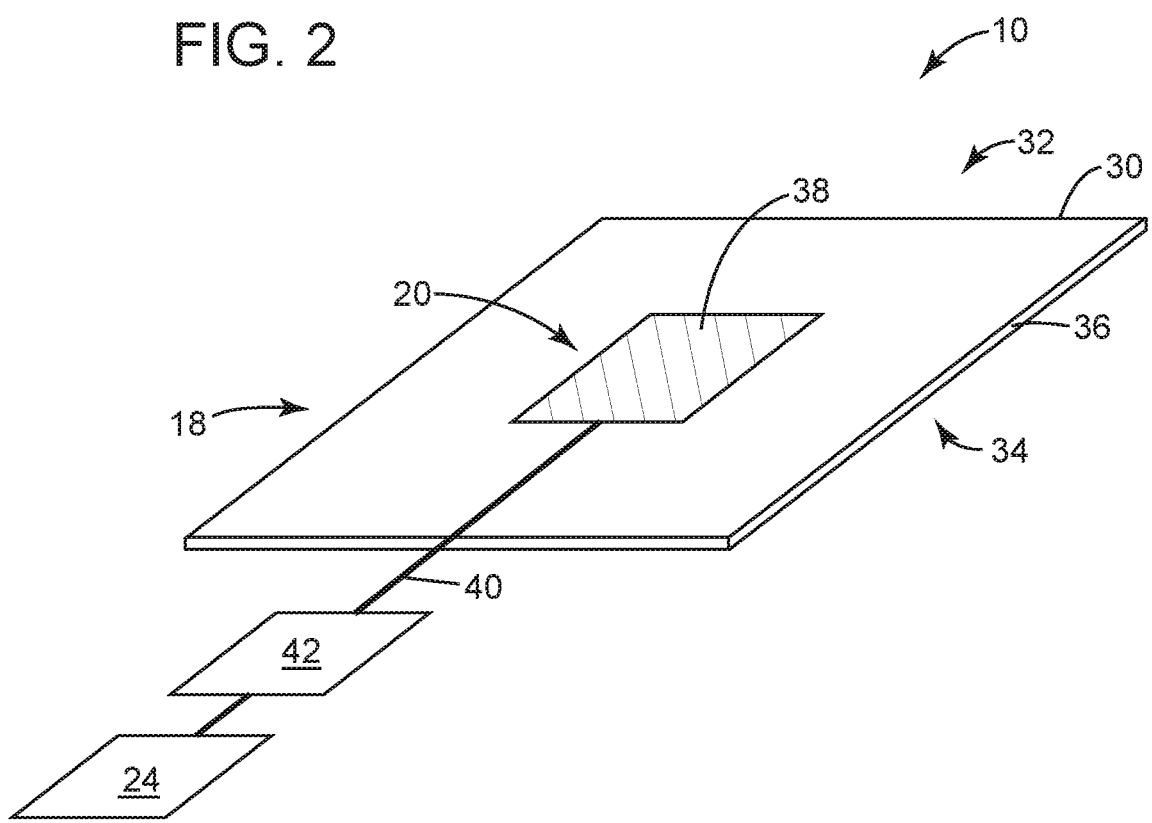
FIG. 2 depicts a schematic diagram of a perspective view from the top of an example of the energy harvester of FIG. 1.

FIG. 2 depicts, schematically, a perspective view of an example of the energy harvester 10 of FIG. 1. The substrate 18 may embody a thin body 30 with opposing sides (e.g., a top side 32 and a bottom side 34) and a peripheral edge 36. The actuator 20 may embody a responsive device 38 to convert mechanical activity of the thin body 30 into the electrical signal 22. Wiring 40 may couple the responsive device 38 to conduct the electrical signal 22 to suitable driver circuitry 42, which may in turn couple with the electronics 24 on the flow device 12. The driver circuitry 42 may include certain discrete components that are useful to condition the electrical signal 22 from the responsive device 38, as necessary. These discrete components may include rectifiers, inverters, amplifiers, etc.

The thin body 30 may have structure that conforms to operation in the flow device 12. This structure may form thin, flexible or semi-rigid members, although it's not uncommon for the thin body 30 to assume other form factors as well. The form factor may assume simple geometries (e.g., square, circular, rectangular, etc.). But more complex geometries (e.g., elliptical, etc.) may be necessary for functionality or construction of the flow device 12 (FIG. 1). Materials may have compositions that correspond to plastics, rubber, metals, and composites. In one implementation, the thin body 30 may exhibit certain physical properties, including elastic and sealing properties, so as to replace springs or other components normally found in the flow device 12. In practice, the thin body 30 may experience natural movement as a result of its function in the device. For example, flow of material 16 in the flow device 12 may stimulate the thin body 30 to resonate or vibrate from its equilibrium position. Material 16 may also flow in contact with the thin body 30 or in contact collateral mechanisms to move or translate the thin body 30 by a set or pre-determined distance.

The responsive device 38 may have structure to respond to the mechanical activity of the thin body 30. This structure may be disposed on the surface of the thin body 30, whether on one or both sides 32, 34. Suitable structure may comprise one or more piezoelectric transducers because they provide appropriate electro-mechanical interaction but would not interrupt operation of the flow device 12. Other structure may leverage ultrasonic, magnetic, or like technologies known now or later developed after filing of this application. Preference may be given to structure (and technology) for the responsive device 38 that maximizes efficiency and output (e.g., current, voltage, etc.) of the electrical signal 22. In one implementation, the structure of the responsive device 38 is in the form of material that exhibits responsive or electro-mechanical properties that mimic piezoelectric transducers. These materials may integrate into the composition of the thin body 30, for example, as weaved, interleaved, or laminated (layered) structures. This feature may be beneficial to form materials that are useful both as the diaphragm (in the pressure regulator or gas meter) as well as the responsive device 38, effectively forgoing the need for physical transducers that mount or are disposed on the thin body 30.

Figure 3:
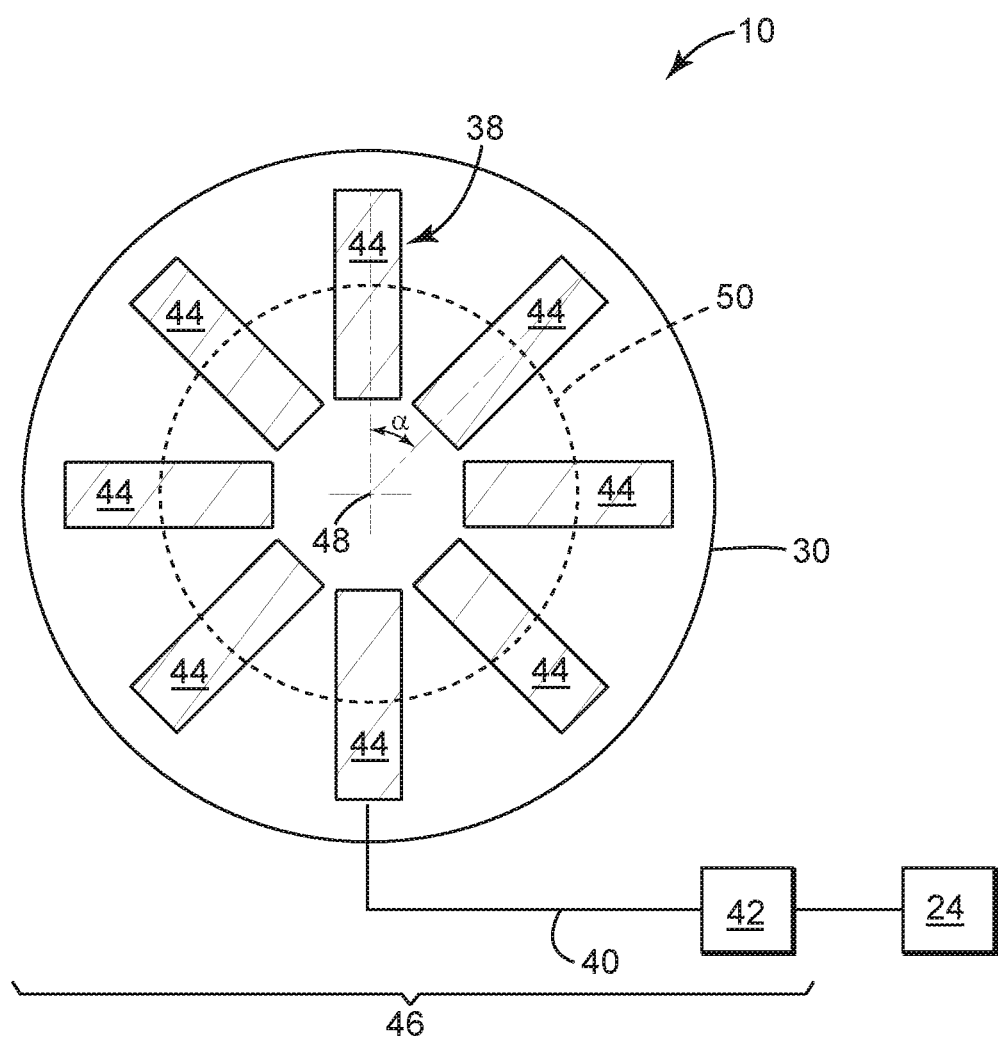
FIG. 3 depicts a schematic diagram of a plan view from the top of an example of the energy harvester of FIG. 1.

FIG. 3 illustrates, schematically, a plan view from the top of the thin body 30 to discuss an example configuration for the responsive device 38 of FIG. 2. This configuration includes one or more discrete piezoelectric transducers 44. These devices may populate the thin body 30 in an array 46. For circular designs, the array 46 may circumscribe a central axis 48 with adjacent ones of the transducers 44 spaced apart from one another by an annular offset $\alpha$. In one implementation, the device may include a buss structure 50 that electrically couples the transducers 44 to the wiring 40 and, if necessary, to the driver circuitry 42. The buss structure 50 may be individual electrical wires. However, for convenience, it may better serve the design to use a circuitized substrate like a printed circuit board (PCB) or flexible circuit to connect the transducers 44. The placement of the transducers 44 can be such to maximize the response from strain of deformation of the thin body 30.

Figure 4:
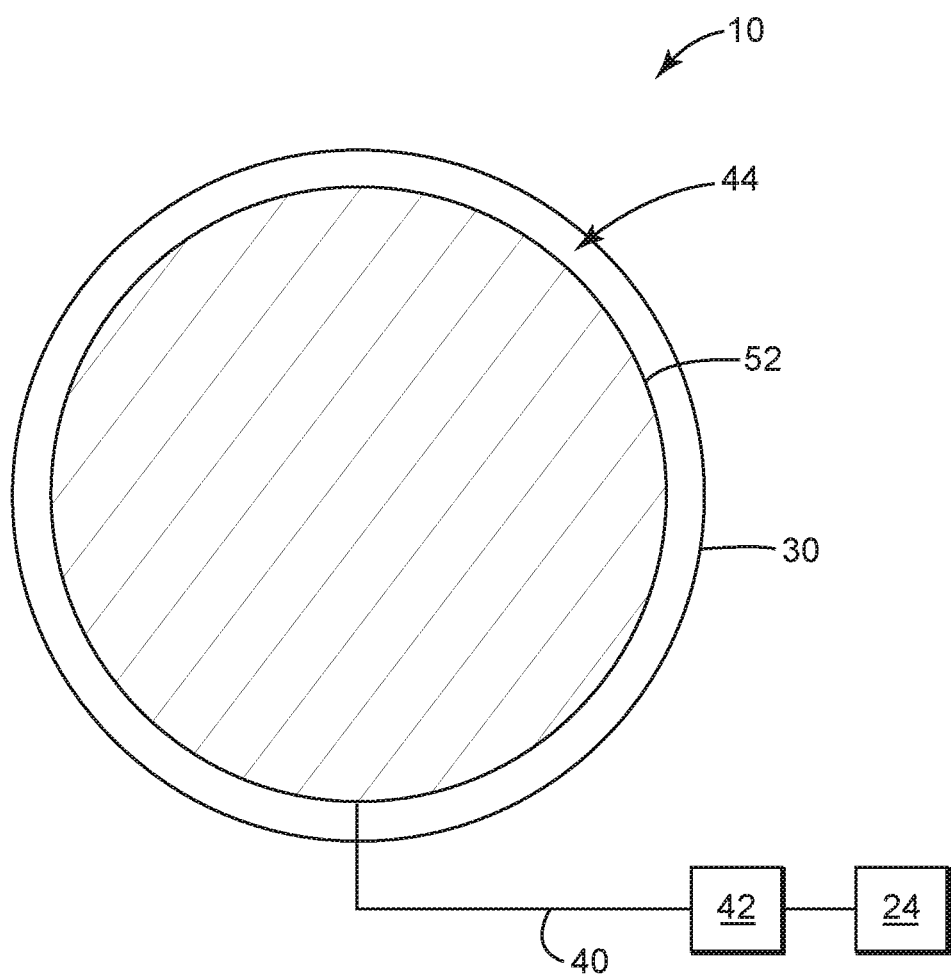
FIG. 4 depicts a schematic diagram of a plan view from the top of an example of the energy harvester of FIG. 1.

FIG. 4 depicts a plan view from the top of the thin body 30 to discuss another example configuration for the responsive device 38 of FIG. 2. In this configuration, the piezoelectric transducer 44 embodies a large, unitary body 52 that covers a majority of the surface area of the thin body 30. This body 52 may attach to the thin body 30 or, in one example and noted above, may itself integrate into material that forms all or part of the thin body 30. As noted above, the piezoelectric transducers may integrate with the diaphragm or membrane to form a monolithic or unitary piece or structure.

Figure 5:
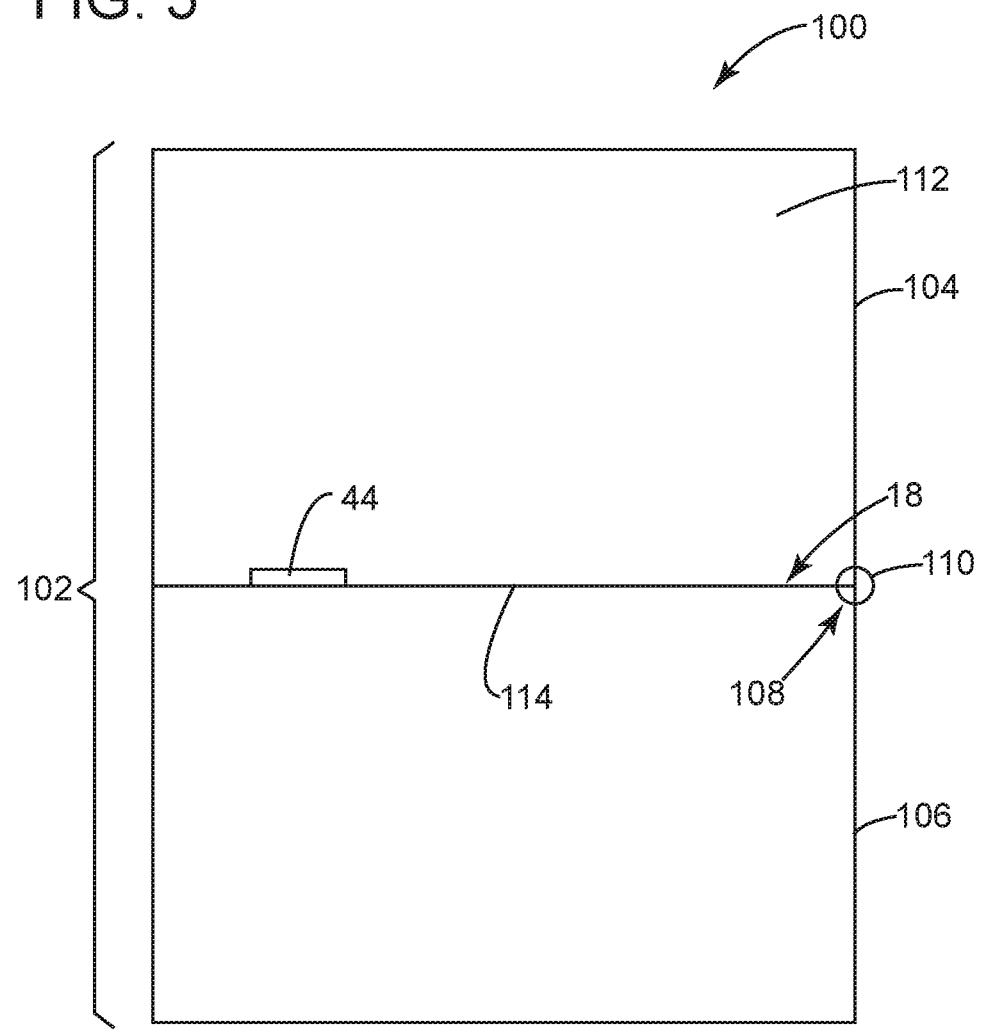
FIG. 5 depicts a schematic diagram of exemplary structure for the flow device in FIG. 1.

FIG. 5 depicts a schematic diagram of exemplary structure 100 for the flow device 12. The structure 100 can embody various types of process devices. Exemplary devices include flow meters, pressure regulators, valves, and the like. Generally, the structure 100 may include a housing 102 with one or more sections (e.g., a first housing section 104 and a second housing section 106). The housing sections 104, 106 may couple together at a peripheral edge 108 with a clamping structure 110. Examples of the clamping structure 110 may include formations on each of the sections 104, 106. These formations may integrate with one another to properly set the housing 102 and form an interior cavity 112. Fasteners like bolts that are spaced circumferentially from one another about the peripheral edge 108 and penetrate the clamping structure 110 to secure the housing sections 104, 106 in position. Inside of the interior cavity 112, the substrate 18 may take the form of a diaphragm 114 that will undertake natural movement that the piezoelectric transducers 44 (or, actuator 20 (FIG. 1), generally) can harness to generate electrical power for the flow device 12.

Figure 6:
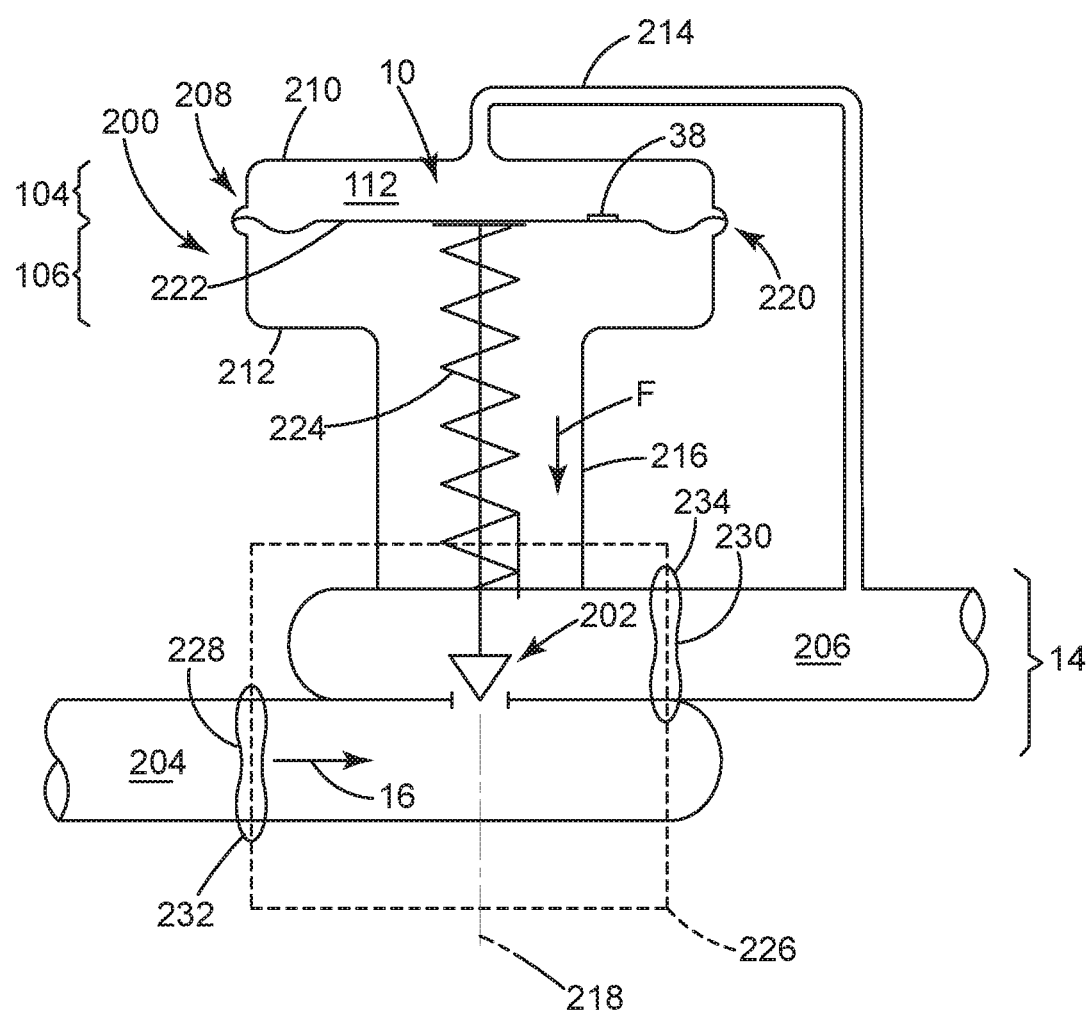
FIG. 6 depicts a schematic diagram of an elevation view of the cross-section of the structure of FIG. 5 embodying a first configuration of a pressure regulator.
Figure 7:
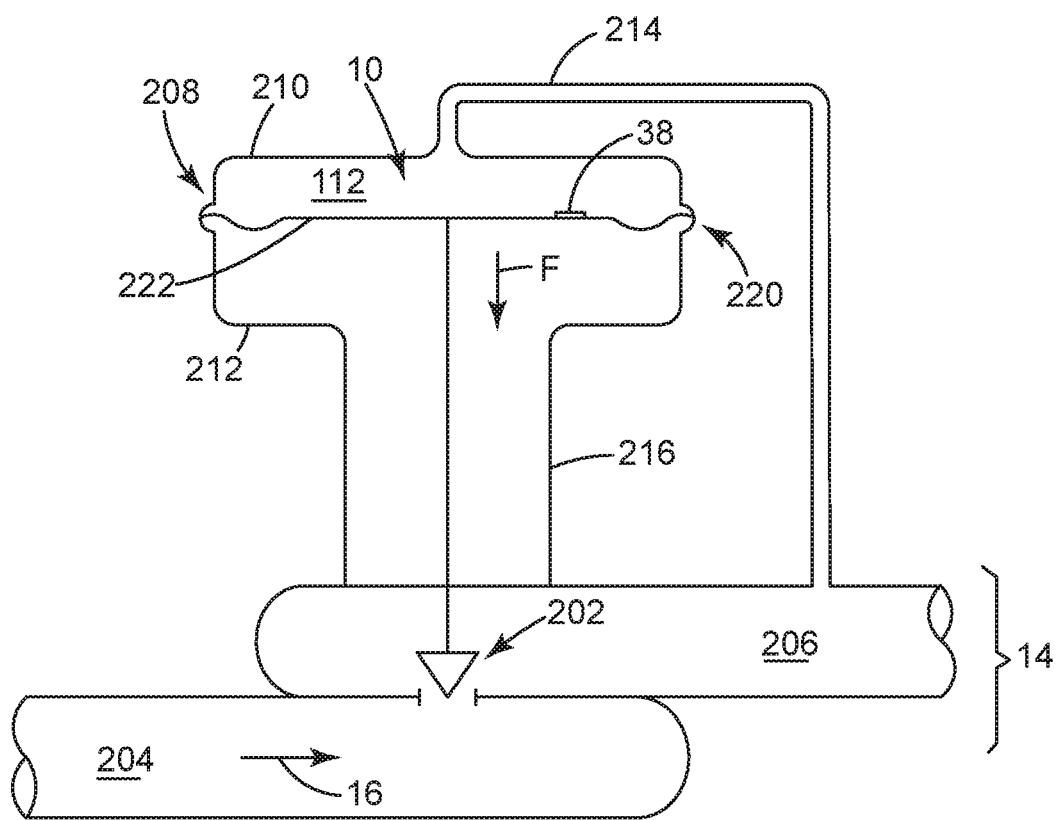
FIG. 7 depicts a second configuration of the pressure regulator of FIG. 6.

FIGS. 6 and 7 depict, schematically, an elevation view of the cross-section of an example of the structure 100 for the flow device 12. In FIG. 6, the structure 100 embodies a pressure regulator 200 with a valve assembly 202 to regulate pressure (e.g., over-pressure protection) between two parts (e.g., a first part 204 and a second part 206) on the conduit 14. The sections 104, 106 may comprise a thin-walled member 208, typically formed of bent sheet or cast metal. The thin-walled member 208 may form two parts (e.g., a top part 210 and a bottom part 212) that mate together to form the interior cavity 112. A reference pressure conduit 214 may extend from the top 210 to the second part 206 of the conduit 14. The reference pressure conduit 214 may be hollow or tube-like to allow material 16 the flow between the first part 202 and the interior cavity 112. The bottom 212 may give way to an elongate cylinder 216 having a longitudinal axis 218. Bent or rounded edges 220 allow the top part 210 and bottom part 212 to nest together, effectively forming the clamping structure 110.

When the two parts 210, 212 are together, the housing 102 (FIG. 5) takes on a form factor that is generally bulbous to enclose the energy harvester 10. The diaphragm 114 may embody a thin, metal or plastic plate 222. The plate 222 may be disposed or sandwiched between the edges 220 at its periphery. Transducers 38 may mount to the plate 222 to make the thin body 30 in FIGS. 3 and 4. This configuration generates the signal 24 in response to motion or vibration of the plate 222. In one implementation, a spring 224 may be disposed in the elongate cylinder 212 and extend into the interior cavity 112. The spring 224 can create a spring force F that sets the transition between an open position and a closed position of the valve assembly 202. This transition may occur, for example, due to pressure reduction in material 16 found in the second part 206 of the conduit 14. The valve assembly 202 will open in response to any resulting pressure differential with material 16 in the first part 204 that exceeds the spring force F due to different flow rate or flow demand. As shown in FIG. 7, the spring 224 may not be necessary if the plate 222 is configured, as noted above, to exhibit physical properties, including elastic and resilient properties, to generate the spring force F to maintain the valve assembly 202 in its closed position.

Referring back to FIG. 6, the pressure regulator 200 works to regulate operation of the valve assembly 204. In one implementation, the device may include a valve body, shown generally by the phantom line identified by the numeral 226. The valve body 226 may be primarily cast or molded using metals or composites compatible with the material 16. It may form a separate piece or member that couples with the elongate cylinder 216 using features (e.g., mating surfaces, grooves, etc.) that are configured to mate together. Fasteners like bolts and seals (e.g., o-rings, gaskets, etc.) may populate these features to provide sufficient engagement and create a fluid-tight seal. The construction may also allow the pressure regulator 200 and the valve body 226 to release from one another, if desired. In one implementation, the valve body 226 can form a fluid pathway that terminates at openings (e.g., a first opening 228 and second opening 230) as part of flange ends 232. In use, the flange ends 232 may connect with parts 204, 206 of the conduit 14 to allow material 16 (FIG. 1) to transit through the valve assembly 202.

Figure 8:
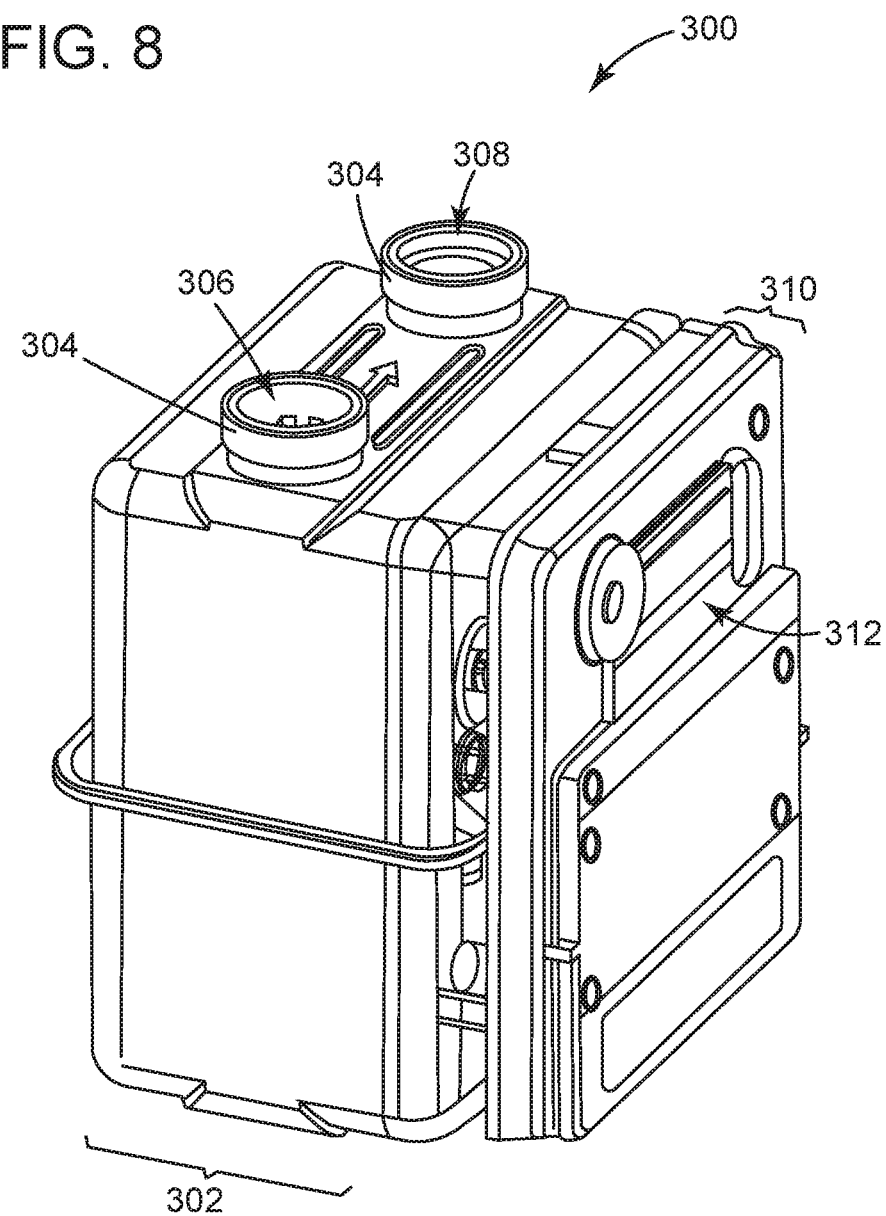
FIG. 8 depicts a schematic diagram of an elevation view of the cross-section of the structure of FIG. 5 embodying a diaphragm-type gas meter.

FIG. 8 depicts a perspective view of another example of the structure 100 for the flow device 12 in assembled form. In this example, the structure 100 embodies a flow meter 300 to measure parameters, such as flow rate of material 16 through the conduit 14. The sections 104, 106 adopt geometry of a box-like casing 302 with protruding members 304 on the top. The protruding members 304 can form openings (e.g., a first opening 306 and a second opening 308) to allow access into the casing 302. The protruding members 304 may include threads to receive fittings on adjacent piping to permit fluid (e.g., gas) to enter and exit the casing 302, via the first opening 306 and the second opening 308, or vice versa. On the front of the casing 302 mounts an ancillary component 310 that includes components useful to measure and display information. The ancillary component 310 may include a visual display 312, for example, that can show data in the form of alpha-numeric characters.

Figure 9:
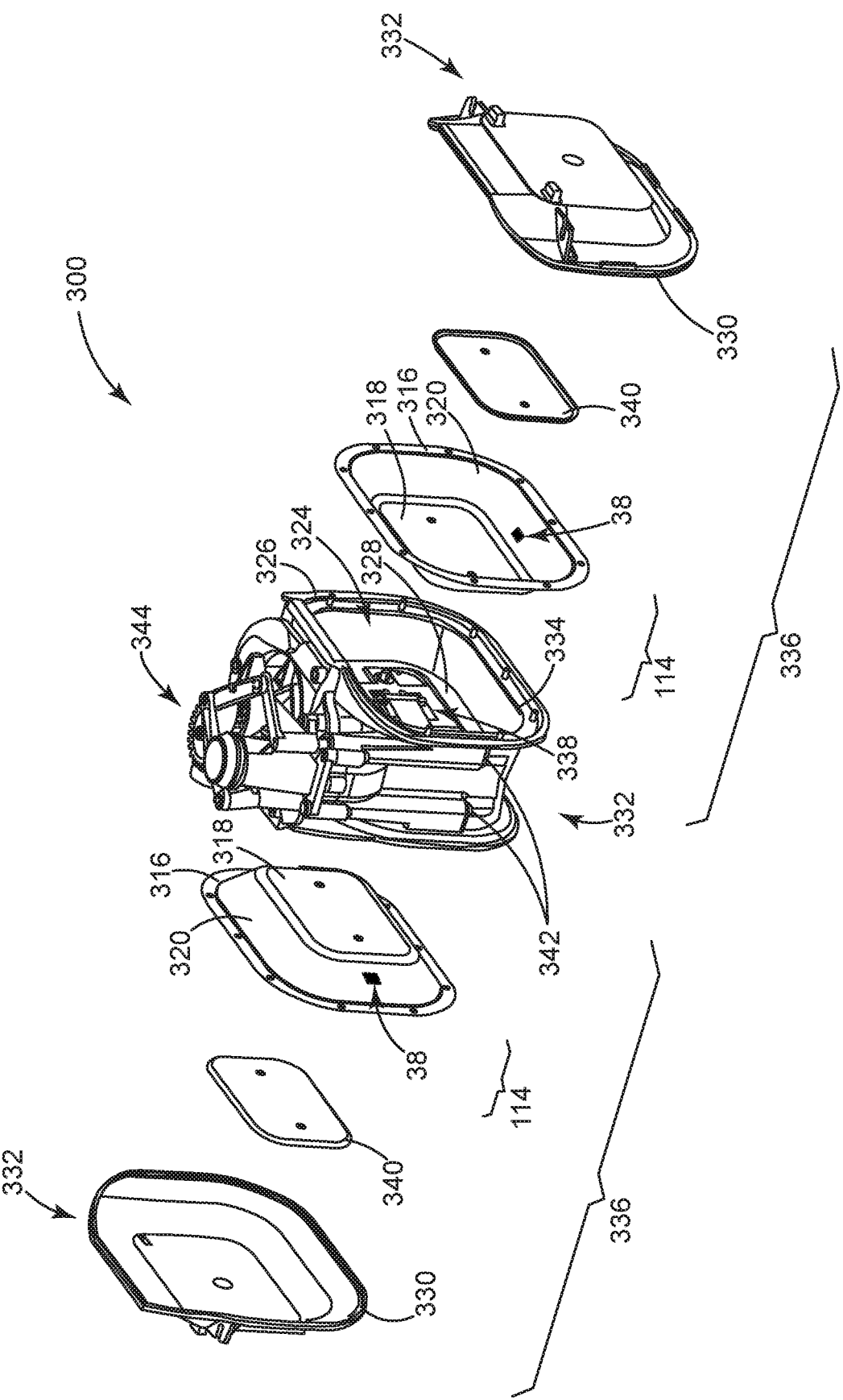
FIG. 9 depicts a perspective view of the gas meter of FIG. 8 in partially-exploded form Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

FIG. 9 shows the flow meter 300 of FIG. 8 in partially-exploded form. The casing 302 is removed to focus on parts found on the interior cavity 112 of the housing 102. The diaphragm 114 embodies a pair of translating members 314, each with a flange region 316 and a moveable region 318. A displaceable region 320 may extend between the regions 316, 318, preferably comprising flexible or pliable materials that are non-permeable to the fluid that flows in the casing 302. These materials allow the moveable region 318 to move in response to flow of material 16 through openings 306, 308. The moveable region 318 can also comprise pliable material; however, it may benefit the design for this region to comprise thin metal or plastic that has limited to no deformation under load. The responsive device 38 may populate the translating members 314 to generate the signal 24 in response to deformation of one or more of the regions 318, 320.

The flow meter 300 may include a central body 322 with recesses 324 on either side. The recesses 324 extend into the central body 322 from a cover mounting feature 326 to a bottom 328. The cover mounting feature 326 is useful to receive and mate with a peripheral edge 330 of cover plates 332. An intervening gasket 334 may reside in the feature 326 to form internal diaphragm compartments 336. In operation, fluid flow alternates between the compartments 336 on the front and the back of the central body 322. The fluid pressurizes one side of the translating members 314 to displace the movable region 318 relative to the bottom 328 of the recess 324.

The flow meter 300 may include a valve assembly to regulate flow of fluid into the compartments 336. This valve assembly may include a pivotable member 338 that resides at the bottom 328 of the recess 324. A plate member 340 may be useful to couple the moveable region 318 to the pivotable member 338, typically so that at least part of the pivotable member 338 will move relative to the bottom 328 in concert with the moveable region 318. In one implementation, the pivotable member 338 can couple to shafts 342 that extend upwards to the top of the central body 322. The shafts 342 can couple with a linkage 344 that resides on top of the flow meter 300. In use, movement of the pivotable members 338 causes the linkage 344 to move to mimic reciprocating motion of the moveable region 318 in the compartments 336. The linkage 344, in turn, regulates flow of material 16 into and out of the compartments 336.

In light of the foregoing discussion, the embodiments herein incorporate improvements that are useful to harvest energy from motion or vibrations on or proximate gas meters and related metrology hardware. These embodiments may utilize piezoelectric devices, like transducers, that generate electrical energy in response to motion or vibration of diaphragms or like flexible structures. In practice, the transducers may supplement or charge batteries that energize electronics particularly for gas meters that reside in remote areas that lack easy access to replace depleted batteries. Powering the electronics by battery power alone presents two common problems. First, batteries can have a finite life that requires them to be periodically replaced according to a maintenance schedule. Second, sometimes batteries die prematurely and unexpectedly, requiring an expensive emergency field replacement.

Embodiments are also contemplated that include a device that has a diaphragm, membrane, or like deformable membrane. Examples of this device can be operable to regulate flow of material. The device can include a responsive device coupled with the deformable membrane, the responsive device having electro-mechanical properties so as to generate a signal in response to motion or vibration of the deformable membrane. In one implementation, the responsive device can couple with a second device, like a gas meter, that is found in proximity to the flow device. This electrical signal may be useful to recharge depleted batteries.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples follow below that include certain elements or clauses one or more of which may be combined with other elements and clauses describe embodiments contemplated within the scope and spirit of this disclosure.

What is claimed is:

1. An energy harvester, comprising:
   a circular non-perforated thin body having a peripheral edge; and
   a responsive device disposed on a surface of the circular non-perforated thin body, the responsive device having electro-mechanical properties so as to generate a signal in response to vibration of the circular non-perforated thin body,
   wherein the circular non-perforated thin body has geometry that locates the peripheral edge in position to engage structure on a housing of a pressure regulator.

2. The energy harvester of claim 1, wherein the responsive device comprises a piezoelectric transducer.

3. The energy harvester of claim 1, wherein the responsive device comprises a plurality of piezoelectric transducers.

4. The energy harvester of claim 3, wherein the plurality of piezoelectric transducers are located on both sides of the circular non-perforated thin body.

5. The energy harvester of claim 3, wherein the plurality of piezoelectric transducers form an array with adjacent ones of the piezoelectric transducers spaced annularly apart from one another about a center axis of the circular non-perforated thin body.

6. The energy harvester of claim 1, wherein the circular non-perforated thin body comprises a metal plate.

7. A pressure regulator, comprising:
   a circular non-perforated metal plate having a peripheral edge;
   a responsive device disposed on the circular circular non-perforated metal plate, the responsive device configured to generate a signal in response to vibration of the circular non-perforated metal plate; and
   a housing enclosing the responsive device.

8. The pressure regulator of claim 7, wherein the housing couples with the peripheral edge.

9. The pressure regulator of claim 7, wherein the housing comprises a first part and a second part that couple with one another to capture the peripheral edge of the circular non-perforated metal plate therebetween.

10. The pressure regulator of claim 7, wherein the responsive device comprises transducers disposed in an array on the circular non-perforated metal plate.

11. The pressure regulator of claim 10, wherein the transducers have piezoelectric properties.

12. The pressure regulator of claim 7, further comprising:
    a valve movable between an open position and a closed position.

13. The pressure regulator of claim 12, further comprising:
    a spring disposed in the housing, the spring configured to bias the valve to the closed position.

14. The pressure regulator of claim 12, wherein the circular non-perforated metal plate is configured with physical properties to bias the valve to the closed position.

15. The pressure regulator of claim 7, wherein the housing comprises:
    a pair of thin-walled members that mate about their peripheral edges to secure the circular non-perforated metal plate therebetween,
    an elongate cylinder coupled with one of the thin-walled members,
    a conduit coupled with the elongate cylinder, where the conduit has two pieces and an aperture to allow flow of fluid from one of the pieces to another of the pieces, and
    a valve disposed in the aperture and coupled with the circular non-perforated metal plate.

16. A method, comprising:
    on a pressure regulator comprising a flexible circular non-perforated diaphragm,
    using the flexible circular non-perforated diaphragm to translate a piezoelectric transducer;
    conducting an electrical signal from the piezoelectric transducer out of the pressure regulator.

17. The method of claim 16, further comprising:
    directing the electrical signal to a gas meter.

18. The method of claim 17, further comprising:
    using the electrical signal to power electronics on the gas meter.

19. The method of claim 17, further comprising:
    using the electrical signal to charge a battery on the gas meter.

20. The method of claim 17, further comprising:
    conditioning the electrical signal for use on the gas meter.

* * * * *